(12) United States Patent
Brettle et al.

(10) Patent No.: US 7,796,760 B2
(45) Date of Patent: Sep. 14, 2010

(54) APPROACH FOR MANAGING ACCESS TO MESSAGES USING ENCRYPTION KEY MANAGEMENT POLICIES

(75) Inventors: Dean Brettle, Gaithersburg, MD (US); Yair Zadik, Palo Alto, CA (US)

(73) Assignee: Liquid Machines, Inc., Lexington, MA (US)

( * ) Notice: Subject to any disclaimer, the term of this patent is extended or adjusted under 35 U.S.C. 154(b) by 89 days.

(21) Appl. No.: 12/033,777

(22) Filed: Feb. 19, 2008

(65) Prior Publication Data

US 2008/0212782 A1 Sep. 4, 2008

Related U.S. Application Data

(62) Division of application No. 10/295,083, filed on Nov. 14, 2002, now Pat. No. 7,333,616.

(60) Provisional application No. 60/336,323, filed on Nov. 14, 2001.

(51) Int. Cl.
*H04L 9/00* (2006.01)
*H04L 9/08* (2006.01)
*G06F 21/00* (2006.01)

(52) U.S. Cl. .................. 380/277; 713/186; 380/286

(58) Field of Classification Search ............ 380/277, 380/286; 713/186
See application file for complete search history.

(56) References Cited

U.S. PATENT DOCUMENTS

| 5,778,395 | A | 7/1998 | Whiting et al. |
| 5,937,066 | A * | 8/1999 | Gennaro et al. ........... 380/286 |
| 6,169,803 | B1 * | 1/2001 | Sako et al. ............... 380/44 |
| 6,215,877 | B1 | 4/2001 | Matsumoto |
| 6,272,225 | B1 * | 8/2001 | Miyauchi et al. .......... 380/286 |
| 6,324,650 | B1 | 11/2001 | Ogilvie |
| 6,760,752 | B1 * | 7/2004 | Liu et al. ................ 709/206 |
| 6,842,523 | B1 * | 1/2005 | Niwa et al. ............... 380/286 |
| 6,845,160 | B1 * | 1/2005 | Aoki ....................... 380/286 |
| 6,947,556 | B1 * | 9/2005 | Matyas et al. ............ 380/29 |
| 7,080,259 | B1 * | 7/2006 | Nakanishi et al. .......... 713/193 |
| 7,149,310 | B2 * | 12/2006 | Sandhu et al. ............ 380/278 |
| 2002/0091930 | A1 * | 7/2002 | Kohl et al. ............... 713/182 |

OTHER PUBLICATIONS

Microsoft, "Microsoft CryptoAPI," Jan. 17, 1996, Microsoft Corp., Version 0.9, entire document.

(Continued)

*Primary Examiner*—Techane J Gergiso
(74) *Attorney, Agent, or Firm*—Hickman Palermo Truong & Becker LLP; Edward A. Becker

(57) ABSTRACT

Controlling access to disseminated messages includes implementing one or more key management policies that specify how various encryption keys are maintained and in particular, when encryption keys are made inaccessible. Deleting a particular key renders inaccessible all copies of messages, known or unknown, associated with the particular key, regardless of the location of the associated messages. A message may be directly or indirectly associated with a deleted key. Any number of levels of indirection are possible and either situation makes the message unrecoverable. The approach is applicable to any type of data in any format and the invention is not limited to any type of data or any type of data format.

18 Claims, 7 Drawing Sheets

OTHER PUBLICATIONS

ZipLip Inc., web site URL "https://www.ziplip.com/products.html", 1999-2002, entire page.

ZipLipInc., web site URL https://www.ziplip.com/products/ZLPublicKeyInfrastructure.html, 1999-2002, entire page.

ZipLip, Inc., web site URL https://www.ziplip.com/technology/summary.html, 1999-2002, entire page.

Bauer, Lujo, et al., "A General and Flexible Access-Control System for the Web", Secure Internet Programming Laboratory, Department of Computer Science, Princeton University, Aug. 2002, 16 pages.

* cited by examiner

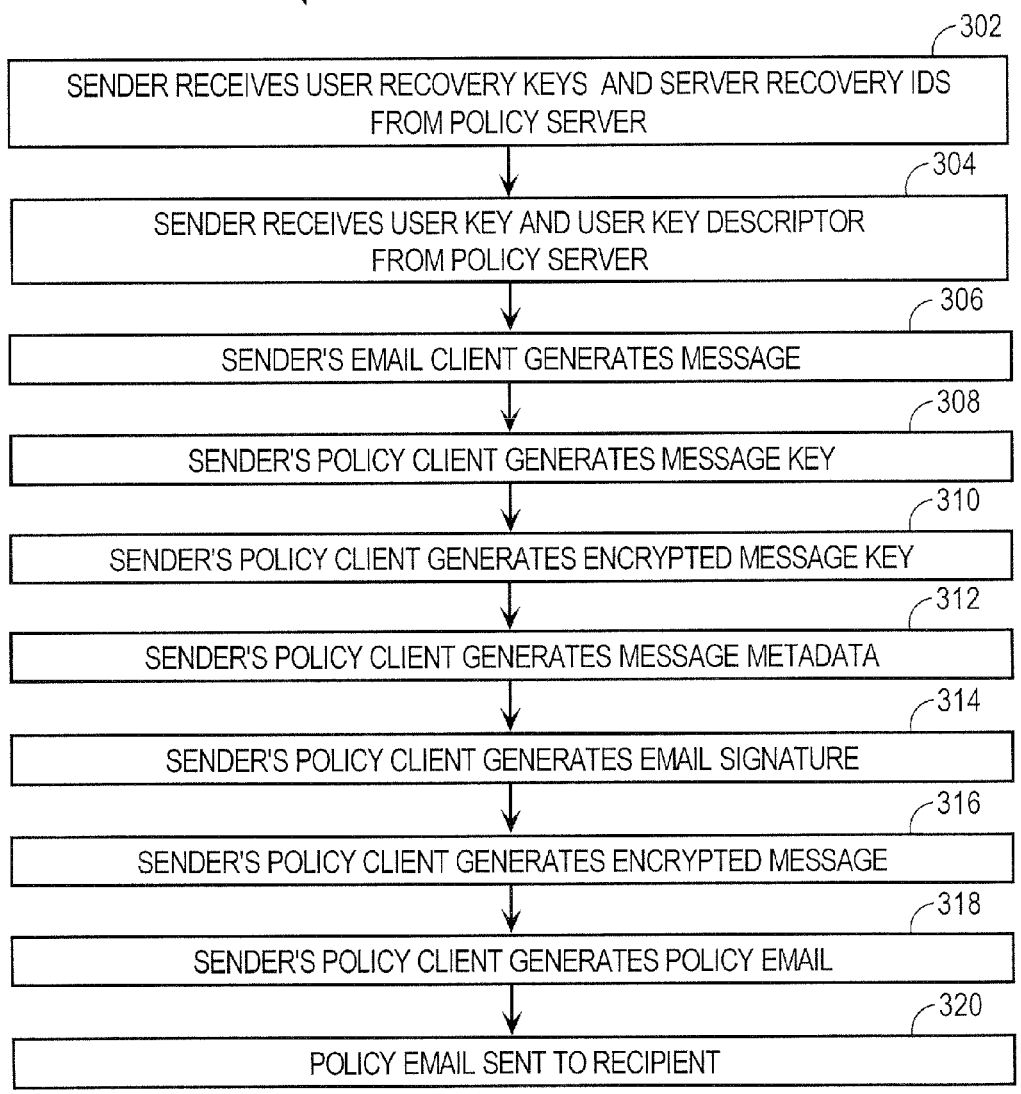

APPROACH FOR MANAGING ACCESS TO MESSAGES USING ENCRYPTION KEY MANAGEMENT POLICIES

RELATED APPLICATIONS AND CLAIM OF PRIORITY

This patent application is a divisional of U.S. patent application Ser. No. 10/295,083 entitled "Approach for Managing Access to Messages Using Encryption Key Management Policies," filed Nov. 14, 2002, now U.S. Pat. No. 7,333,616, which claims priority to U.S. Provisional Application No. 60/336,323 entitled "Policy Management in Message Communications", filed Nov. 14, 2001, the contents all of which are incorporated by reference in their entirety for all purposes as if fully set forth herein.

FIELD OF THE INVENTION

The invention relates generally to data management, and more specifically to an approach for managing access to messages using encryption key management policies.

BACKGROUND OF THE INVENTION

Many computers are now interconnected in one or more networks or internetworks. One of the most widely used communications networks is the worldwide packet data communications network known as the Internet. The Internet provides access to enormous amounts of information and may be used to transport electronic mail ("email"). A user of a network such as the Internet is associated with a unique email address. The email address may represent an account that is maintained on an email server. Anyone with a computer and an email processing program ("email client") can remotely send one or more email messages to any address among millions of addresses, and the recipient may use its email client to read the messages.

Despite the benefits provided by the Internet, users have recently recognized important security issues associated with Internet email. First, the complexity of the Internet allows information to fall into the hands of unintended third parties. For example, when an email is sent via the Internet, the email may travel through numerous sub-networks to reach its destination. Many of these sub-networks include locations where data is temporarily stored before being forwarded to the next location. As a result, copies of an email may be stored at numerous locations unknown to the sender, even though the sender only intended for the email to be provided to a particular recipient or group of recipients. Further, email is easily forwarded to other recipients that are not known to the original sender. As a result, although a sender intends for only a particular recipient to receive a particular email, the email may be forwarded to and received by other recipients.

Once the email has been transported via the Internet, deleting all copies of the email can be difficult, if not impossible, to accomplish. Consider a sensitive email that has been sent via the Internet and now needs to be completely deleted. Locating and deleting the email from the sending and receiving locations is relatively straightforward. However, locating and deleting all copies of the email is difficult, if not impossible, because of the difficulty in determining the locations of all copies of the email. Because the Internet is a packet-switched network, data packets that make up a particular message, or a complete copy of a message, may be stored on intermediate servers of internetworks logically located between sender and recipient; the location of such servers is not predictable. Furthermore, even if all copies of the email are located, special privileges or permissions may be required to delete the copies. For example, some copies may reside on servers in remote locations in other countries. As a result, deleting all copies of the email may be extremely difficult, if not impossible, to accomplish.

These problems are not limited to the Internet. Many corporations have extensive communication networks that have numerous servers, archives, hubs and backup systems where email might be stored. Moreover, these problems are not limited to email, but apply to any type of information transported over communication networks.

Based on the foregoing, there is a need to control access to information disseminated on communications networks. There is a particular need for a comprehensive approach for controlling and tracking access to data disseminated on communications networks.

BRIEF DESCRIPTION OF THE DRAWINGS

Embodiments are illustrated by way of example, and not by way of limitation, in the figures of the accompanying drawings in which like reference numerals refer to similar elements and in which:

FIG. 3 is a flow diagram that depicts an approach for creating a policy email.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Various aspects and features of exemplary embodiments are described in more detail in the following sections:

I. INTRODUCTION
II. POLICY EMAIL SYSTEM ARCHITECTURE
III. POLICY EMAIL STRUCTURE
IV. CREATING A POLICY EMAIL
V. READING A POLICY EMAIL
VI. MANAGING KEYS USING KEY MANAGEMENT POLICIES
VII. OTHER COMPONENTS
VIII. IMPLEMENTATION MECHANISMS

I. Introduction

Controlling access to disseminated messages generally involves implementing one or more key management policies that specify how various encryption keys are maintained and in particular, when encryption keys are made inaccessible. Deleting a particular key renders inaccessible all copies of messages, known or unknown, associated with the particular key, regardless of the location of the associated messages. A message may be directly associated with a deleted key. For example, a message may be directly associated with a deleted key by having been encrypted using the deleted key. A message may also be indirectly associated with a deleted key. For example, a message may be indirectly associated with a deleted key by being encrypted with a key that in turn was encrypted using the deleted key. Any number of levels of indirection are possible and either situation makes the message unrecoverable.

The approach is applicable to any type of data in any format and the invention is not limited to any type of data or any type of data format. Examples of data include, but are not limited to, text data, voice data, graphics data and email. Although embodiments of the invention are described hereinafter in the context of controlling access to email, the invention is not limited to the email context and is applicable to controlling access to any type of messages or data.

II. Policy Email System Architecture

Figure 1A:
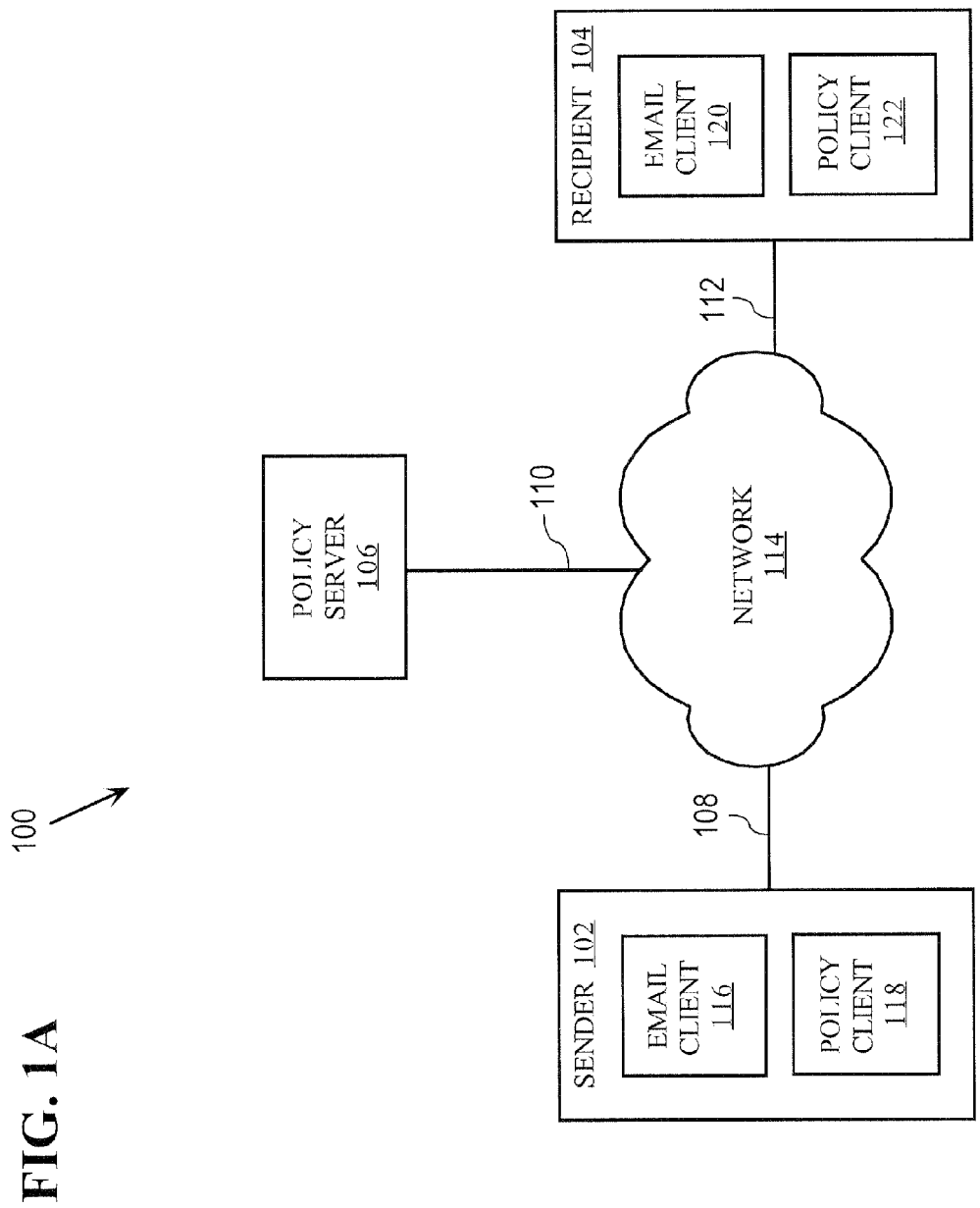
FIG. 1A is a block diagram that depicts a policy email architecture for controlling access to messages.

FIG. 1A is a block diagram that depicts a policy email architecture 100 for controlling access to messages according to an embodiment of the invention. Policy email Architecture 100 includes a sender 102, a recipient 104 and a policy server 106 communicatively coupled via links 108, 110, 112 and a network 114. Links 108, 110, 112 and network 114 may be implemented by any medium or mechanism that provides for the exchange of data between sender 102, recipient 104 and policy server 106. Examples of links 108, 110, 112 and network 114 include, without limitation, a network such as a Local Area Network (LAN), Wide Area Network (WAN), Ethernet or the Internet, or one or more terrestrial, satellite or wireless links.

Sender 102 and recipient 104 may be any type of computing platform, for example, a personal computer. Sender 102 and recipient 104 are typically configured with local storage, such as one or more disks. Sender 102 is configured with an email client 116 and a policy client 118. Recipient 104 is configured with an email client 120 and a policy client 122. Email clients 116, 120 are configured to generate and read emails. An example implementation of email clients 116, 120 is Outlook by Microsoft Corporation. Policy clients 118, 122 are configured to create and process policy emails as described in more detail hereinafter. An example implementation of policy clients 118, 122 is the Omniva Policy Client by Omniva Policy Systems Inc.

Figure 1B:
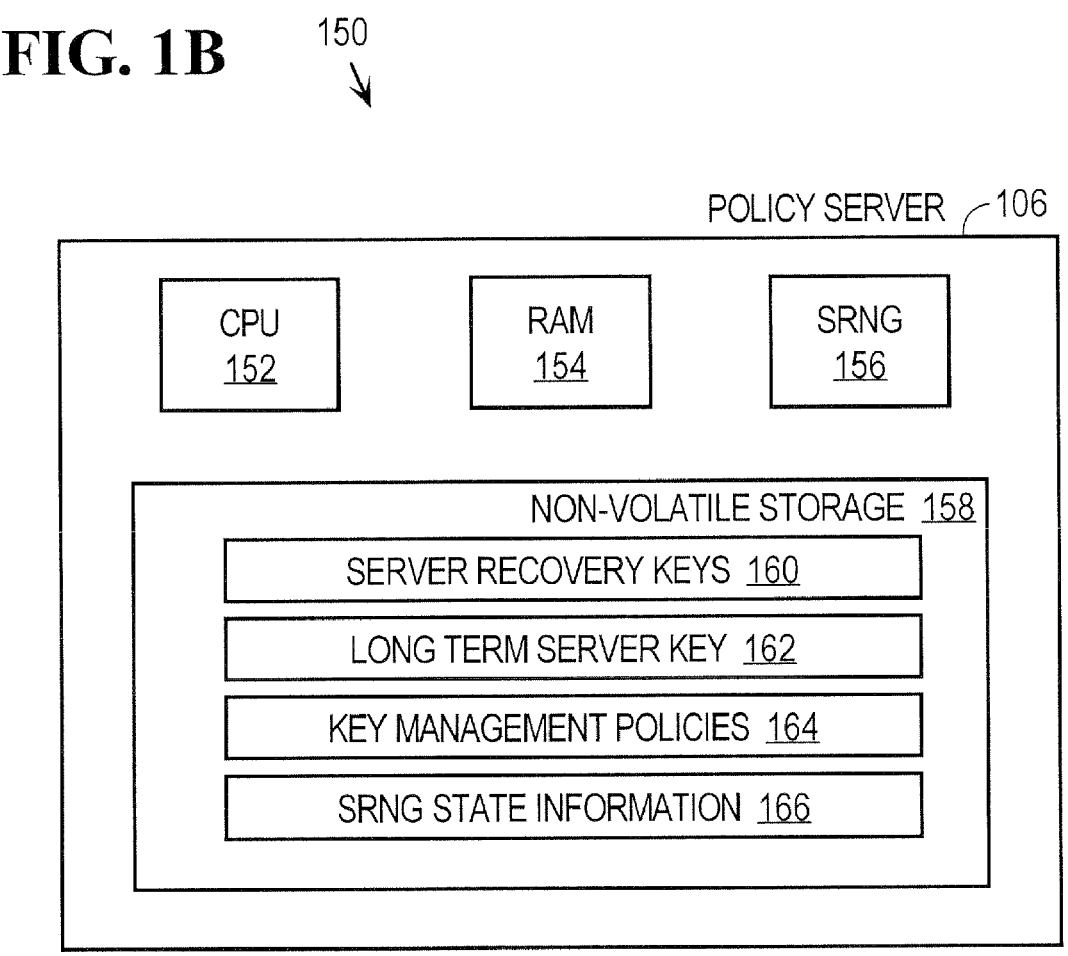
FIG. 1B is a block diagram that depicts an example embodiment of the policy server depicted in FIG. 1A.

FIG. 1B is a block diagram 150 that depicts an example embodiment of policy server 106. Policy server 106 may be implemented in many ways, and the invention is not limited to a particular key repository implementation. Policy server 106 includes a Central Processing Unit (CPU) 152, a Random Access Memory (RAM) 154, a cryptographically Secure Random Number Generator (SRNG) 156 and a non-volatile storage 158. CPU 152 is configured to execute sequences of instructions stored in RAM 154 or non-volatile storage 158, for example, for carrying out the various policy server functions described herein. SRNG is configured to generate a random number that is used to generate server recovery keys 160 and long term server key 162 as described in more detail hereinafter. According to one embodiment of the invention, SRNG 156 is seeded with entropy that may be shared with other policy servers configured with SRNGs. This approach ensures that the other policy servers have the same server recovery keys and long term server key as policy server 106 without having to constantly mirror policy server 106 with the other policy servers.

Non-volatile storage 158 includes server recovery keys 160, a long term server key 162, one or more key management policies 164 that are each described in more detail hereinafter. SRNG state information 166 contains data that defines one or more state attributes of SRNG 156. According to one embodiment of the invention, SRNG state information 166 is updated after each use of SRNG 156 to reflect the current state of SRNG 156.

Policy Server 106 is also configured to "scrub" data that has been deleted from RAM 154 and non-volatile storage 158. As used herein, the term "scrub" or "scrubbing" refers to a process of overwriting deleted data with one or more known values or patterns to make the deleted data permanently unrecoverable. For example, policy server 106 may delete a particular server recovery key 160 in accordance with key management policies 164 as described hereinafter, and then scrub the particular server recovery key 160 to render the particular server recovery key 160 irretrievable using computer forensic techniques.

In some situations, the security of policy server 106 may be important. Specifically, there may be concerns that an unauthorized user may gain access to policy server 106 and may obtain, alter or destroy data, such as server recovery keys 160, long term server key 162, management policies 164 or SRNG state information 166. Accordingly, various precautions may be employed to prevent, or at least reduce, the likelihood of an unauthorized user gaining access to and altering or destroying data stored on non-volatile storage 158.

For example, policy server 106 may be implemented within a secure physical structure that limits unauthorized physical access to policy server 106. Policy server 106 may also be implemented with a secure interface to link 110. Policy server 106 may also use a secure communications protocol to reduce the likelihood of an unauthorized user gaining access to policy server 106. Also, policy server 106 may be implemented with one or more backup key databases for maintaining data.

Similar concerns may exist about the security of links 108, 110, 112 and network 114. Specifically, there may be concerns that unauthorized users may gain access to data transmitted from policy server 106 to sender 102 and recipient 104 over links 108, 110, 112 and network 114. Therefore, according to one embodiment of the invention, links 108, 110, 112 and network 114 are implemented in a secure manner, for example using a secure communications protocol and/or a secure physical infrastructure.

III. Policy Email Structure

As used herein, a Message Authentication Code (MAC) is determined based upon a message and a key. More specifically, the expression MAC(m; k) is the Message Authentication Code of a message "m" using a key "k". Both m and k are necessary to compute a MAC. From the MAC, you can not determine m or k. A MAC is a fixed-length hash that can be used as a key that is as strong as k (assuming the MAC and k are the same number of bits). According to one embodiment of the invention, the HMAC-SHA1 algorithm is used to compute MACs.

Figure 2:
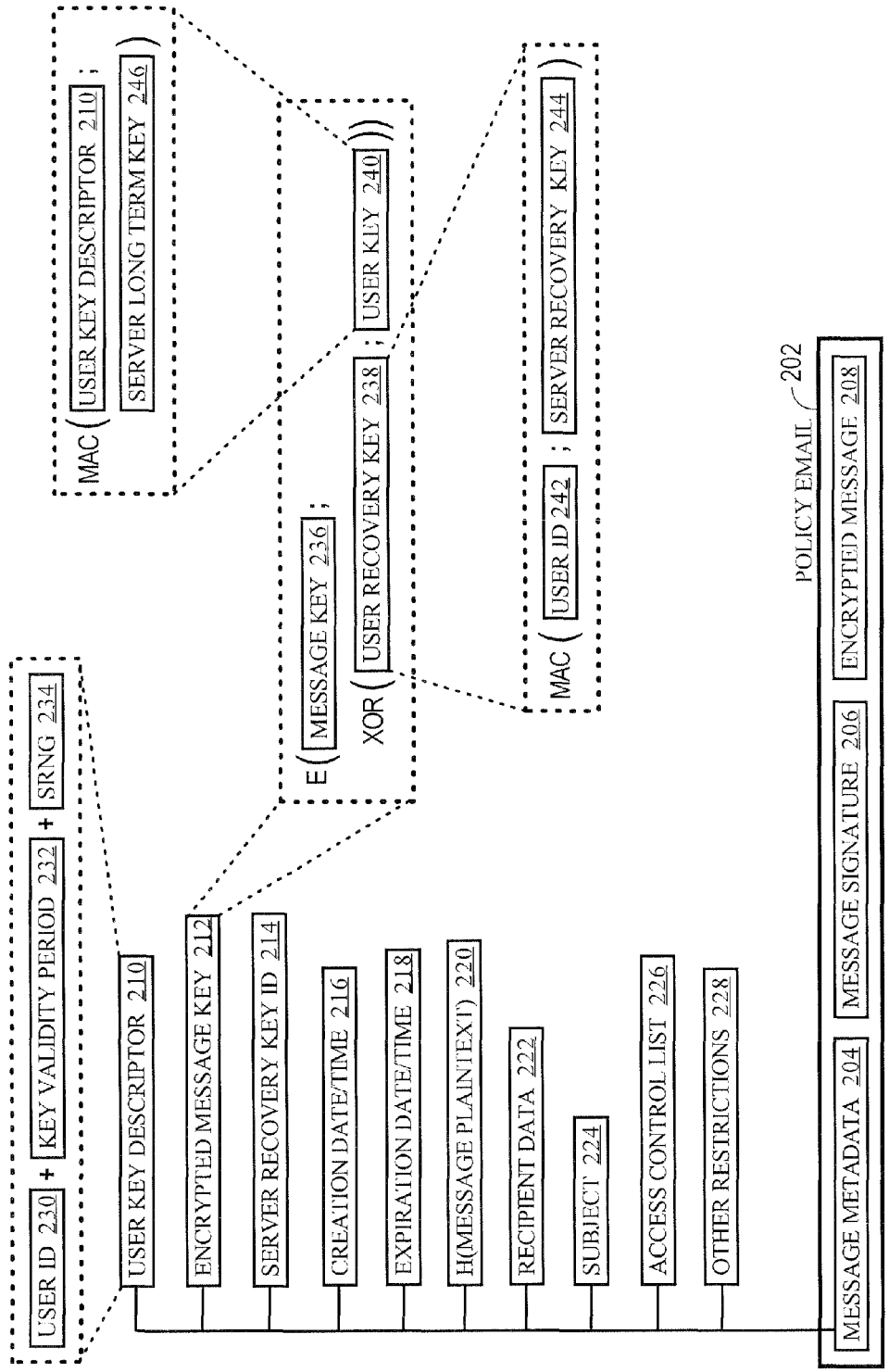
FIG. 2 is a flow diagram that depicts an approach for creating a policy email according to an embodiment of the invention.

FIG. 2 is a block diagram 200 that depicts the structure of a policy email 202 according to one embodiment of the invention. Policy email 202 may be formatted according to the requirements of a particular application and the invention is not limited to any particular formatting. According to one embodiment of the invention, policy email 202 is formatted as an HTML message.

Policy email 202 includes message metadata 204, a message signature 206 and an encrypted message 208. Message metadata 204 includes a user key descriptor 210, an encrypted message key 212, a server recovery key identification (ID)

214, a creation date/time 216 and an expiration date/time 218. Message metadata also includes a hash H(m) of the message plaintext 220. H(m) is a one-way hash or digest of m where m cannot be determined from H(m) and given a particular hash value, an m cannot be determined that will produce the particular hash value. According to one embodiment of the invention, the SHA1 algorithm is used to compute the hash H(m) of the message plaintext 220. Message metadata 204 also includes recipient data 222, subject 224, an access control list (ACL) 226 and other restrictions 228. Each of these elements is described in more detail hereinafter.

User key descriptor 210 generally describes who is allowed to use the user key and when. According to one embodiment of the invention, user key descriptor 210 includes a user ID 230, a key validity period 232 and a Server Random Number Generator value (SRNG) 234. User ID 230 is data that uniquely identifies sender 102. Key validity period 232 is data that specifies a time period when user key descriptor 210 may be used. SRNG 234 is used to ensure that each user key descriptor is unique and to frustrate differential cryptanalysis based on multiple descriptor-key pairs.

Encrypted message key 212 is a message key 236 encrypted with the XOR of user recovery key 238 and user key 240. As described in more detail hereinafter, encrypted message key 212 is generated by policy client 118 and included in message metadata 204 of policy email 202. Policy client 122 extracts encrypted message key 212 from policy email 202 and provides encrypted message key 212 to policy server 106. Message key 236 is generated by policy client 118 based on a SRNG seeded with entropy received from policy server 106.

As used herein, the expression "E(m; k)" refers to encrypting a message "m" with a key "k". According to one embodiment of the invention, encryption is performed using the Advanced Encryption Standard (aka Rijndael) algorithm with a 128 bit key in Cipher Block Chaining (CBC) mode with PKCS#7 padding. Policy client 118 generates a random initialization vector (IV) that is provided to policy server 106 in message metadata 204. According to one embodiment of the invention, when a MAC value is used as a key and the MAC is more than 128 bits, only the most significant 128 bits are used.

User recovery key 238 is determined by computing the MAC of User ID 242 and server recovery key 244. Policy server 106 issues one or more user recovery keys to policy client 118. User recovery key 238 controls the recoverability of messages sent by sender 102 that are associated with a particular server recovery key, which, in the present example, is server recovery key 244. Policy client 118 is responsible for ensuring that user recovery key 238 is not compromised and ensuring that user recovery key 238 is scrubbed from sender 102 at the appropriate time. Policy server 106 can compute user recovery key 238 if and only if server recovery key 244 still exists and is available. Server recovery key 244 cannot be determined from user recovery key 238, so compromise of user recovery key 238 does not compromise policy emails sent by other users.

Server recovery key 244 may be used to control the recoverability of a relatively large number of messages. Once a server recovery key has been scrubbed, all messages associated with the server recovery key become unrecoverable. In the present example, suppose that a particular message is encrypted with message key 236. Message key 236 is encrypted with the XOR of user recovery key 238 and user key 240 and message key 236 is deleted. In this situation, server recovery key 244 is required to calculate user recovery key 238 and to recover message key 236. If server recovery key 244 is deleted, message key 236 and the particular message cannot be recovered.

According to one embodiment of the invention, policy server 106 creates server recovery keys based a random number generated by SRNG 156. Each policy server maintains its server recovery keys in a secure manner, i.e., by not sharing server recovery keys with any other entity. In addition, server recovery keys are deleted from policy server 106 based upon one or more specified key management policies, as described in more detail hereinafter.

Policy server 106 determines user key 240 by computing the MAC of user key descriptor 210 and a server long term key 246. According to one embodiment of the invention, server long term key 246 is generated from a SRNG and may be shared among multiple policy servers. Policy server 106 provides user key 240 and user key descriptor 210 to policy client 118. Policy client 118 is responsible for ensuring that user key 240 is not compromised and that a valid user key 240 is available for the maximum time that a user may operate offline. Policy client 118 is also responsible for deleting and scrubbing user key 240 after expiration.

User key 240 may be periodically changed to limit the number of message keys encrypted with user key 240. If an attacker compromises a user recovery key and the current user key, the attacker will not be able to decrypt all messages sent while using a previous or future user key. Policy client 118 uses user key 240 to sign messages. Periodically changing user key 240 may also limit the time for which an attacker can sign messages with a single compromised user key 240. This also prevents users who become untrusted, e.g., ex-employees, from signing messages created long after leaving the company.

Server recovery key ID 214 is data that uniquely identifies server recovery key 244 used to create encrypted message key 212. Policy server 106 uses server recovery key ID 214 to locate server recovery key 244 at a future time. Policy server 106 provides server recovery key ID 214 with user recovery key 238 to policy client 118. Policy server 106 also provides information about the particular key management policy associated with server recovery key 244. The information may specify, for example, that server recovery key 244 is associated with a particular project or expires on a particular date.

Creation date/time 216 indicates the creation date and/or time of the message and expiration date/time 218 indicates an expiration date and/or time of the message. Recipient data 222 is data that identifies authorized recipients, i.e., readers, of policy email 202. Subject 224 is data that specifies a subject of the message. ACL 226 and other restrictions 228 are data that specify various controls and restrictions placed on policy email 202.

Policy client 118 determines message signature 206 by computing the MAC of message metadata 204 and user key 240. Message signature 206 is used to ensure that portions of message metadata 204, such as ACL 226 or other restrictions 228, have not been altered. Since message metadata 204 contains a hash of message plaintext 220, message signature 206 may also be used to verify that the message plaintext has not been altered. Limiting access to user key 240 to sender 102 and policy server 106 prevents impersonation of sender 102. As is described in more detail hereinafter, message signature 206 is verified by recipient 104 sending the message metadata 204 and message signature 206 to policy server 106. Policy server 106 computes a known correct message signature and compares it to the message signature 206 provided by recipient 104. If the two messages signatures match, then recipient 104 computes a hash of the message plaintext, i.e., H(message plaintext), and compares it to the hash of the message plaintext 220 included in message metadata 204 to verify the integrity of the message.

Policy client 118 generates encrypted message 208 by encrypting the message plaintext with message key 236.

The foregoing structure of policy email 202 is provided as an example and is not meant to depict the required elements of policy email 202. Many variations are possible that include fewer than or more than the depicted elements.

IV. Creating a Policy Email

FIG. 3 is a flow diagram 300 that depicts an approach for creating a policy email according to an embodiment of the invention. In step 302, sender 102 receives one or more user recovery keys and one or more server recovery key IDs from policy server 106. In step 304, sender 102 receives user key 240 and user key descriptor 210 from policy server 106. Note that after step 304, the policy client can create arbitrarily many policy messages subject to the key management policies associated with the received user recovery keys without contacting the policy server.

In step 306 the email client 116 of sender 102 generates a message to be sent to recipient 104. In step 308 the policy client 118 of sender 102 generates message key 236 to be used to encrypt the email. In step 310, policy client 118 generates encrypted message key 212. In step 312, policy client 118 generates message metadata 204. In step 314, policy client 118 generates message signature 206. In step 316, policy client 118 generates encrypted message 208 by encrypting the message with the message key. In step 318, policy client 118 generates policy email 202 that includes message metadata 204, message signature 206 and encrypted message 208. In step 320, sender 102 sends policy email 202 to recipient 104 via links 108, 112 and network 114.

Although flow diagram 300 depicts a particular set of steps in a particular order, other implementations may use fewer or more steps, in the same or different order, than those depicted in FIG. 3.

V. Reading a Policy Email

Figure 4A:
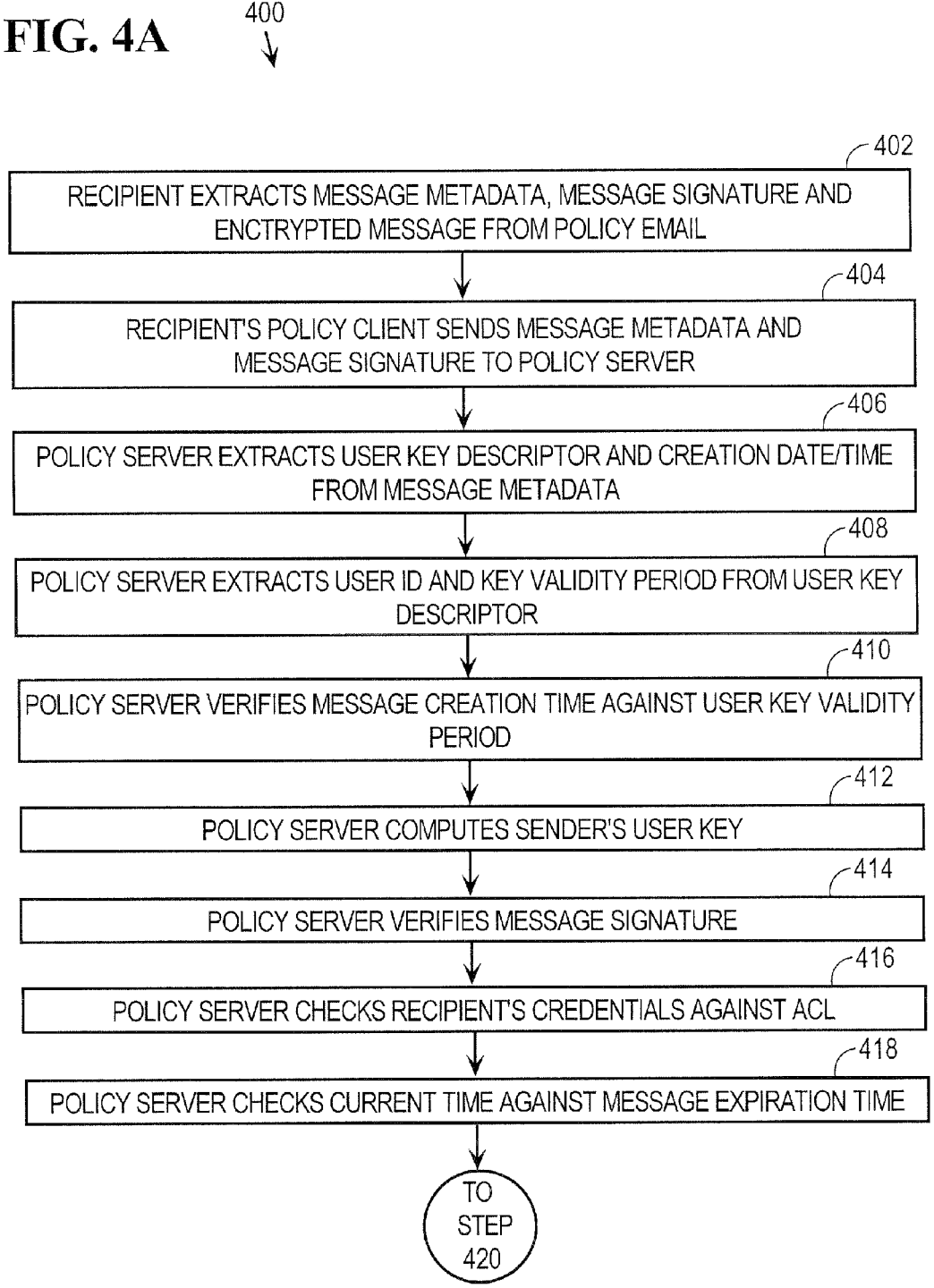
FIGS. 4A and 4B are flow diagrams that depict an approach for reading a policy email.
Figure 4B:
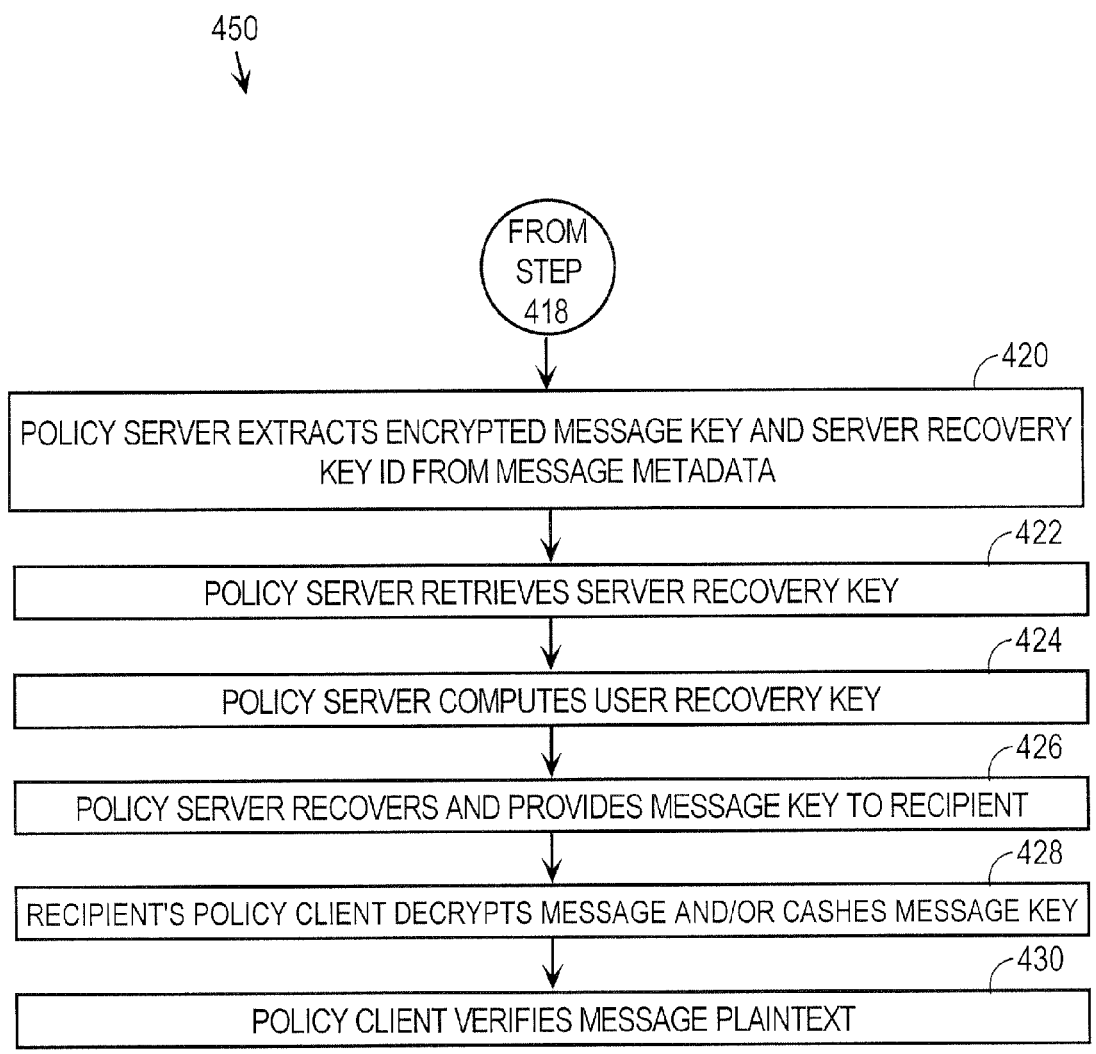

FIGS. 4A and 4B are flow diagrams 400, 450 that depict an approach for reading a policy email according to an embodiment of the invention. In step 402, recipient 104 extracts the message metadata 204, message signature 206 and encrypted message 208 from policy email 202.

In step 404, policy client 122 sends the extracted message metadata 204 and message signature 206 to policy server 106 via links 110, 112 and network 114. In step 406, policy server 106 extracts user key descriptor 210 and creation date/time 216 from message metadata 204.

In step 408, policy server 106 extracts user ID 230 and key validity period 232 from the extracted user key descriptor 210. In step 410, policy server 106 checks the creation date/time 216 against the key validity period 232. If the message was created outside the key validity period 232, then recipient 104 is notified that the message signature is invalid and that policy email 202 cannot be read.

In step 412, policy server 106 computes user key 240 using the sender's user key descriptor 210 and the server long term key 248. In step 414, policy server 106 verifies message signature 206. Policy server 106 computes a known correct message signature by determining a MAC of message metadata 204 and user key 240. Policy server 106 then compares the known correct message signature with the message signature 206 extracted from policy email 202. If they are not identical, then policy server 106 notifies recipient 104 that the message signature 206 for policy email 202 is not valid.

If policy server 106 determines that message signature 206 is valid, then in step 416, policy server 106 checks recipient 104's authentication credentials against access control list 226. If access is denied based on this check, then policy server 106 notifies recipient 104 that access to the message is denied.

If policy server 106 determines that recipient 104's authentication credentials allow access to policy mail 202, then in step 418, policy server 106 checks the current time against the message expiration date/time 218. If the message has expired and recipient 104 is not a special "recovery" user, policy server 106 notifies recipient 104 that the message has expired.

If policy server 106 determines that policy mail 202 has not expired, then in step 420 (FIG. 4B), policy server 106 extracts encrypted message key 212 and server recovery key ID 214 from message metadata 204. In step 422, policy server 106 retrieves server recovery key 244 using server recovery key ID 214. Policy server 106 notifies recipient 104 that policy email 202 cannot be read if server recovery key 244 has been deleted.

In step 424, policy server 106 computes user recovery key 238 from user ID 242 and server recovery key 244. In step 426, policy server 106 decrypts encrypted message key 212 to recover message key 236 and provides message key 236 to policy client 122. In step 428, policy client 122 decrypts encrypted message 208 and/or caches the message key. In step 430, policy client 122 computes a hash of the message plaintext and compares it to the hash of the message plaintext 220 extracted from message metadata 204. If they are not identical, policy client 122 notifies the user that an error may have occurred and the policy email 202 cannot be read.

Although flow diagrams 400 and 450 depict a particular set of steps in a particular order, other implementations may use fewer or more steps, in the same or different order, than those depicted in FIGS. 4A and 4B.

VI. Managing Keys using Key Management Policies

According to one embodiment of the invention, server recovery keys are deleted from policy server 106 based upon one or more specified key management policies 164. Key management policies 164 may be created by administrative personnel using various administrative tools and/or may be provided to policy server 106 from an external source.

The particular key management policies employed may vary depending upon the requirements of a particular application and the invention is not limited to any particular key management policy. For example, a key management policy may specify that certain server recovery keys are to be deleted based upon time, i.e., at the end of a specified period of time, such as a day. This type of key management policy would provide "daily" server recovery keys to allow deletion of all messages for a particular day by deleting the server recovery key for the particular day. Other key management policies may be based upon subjects or projects. In this situation, the key management policy causes the deletion of one or more server recovery keys associated with a subject or project, which in turn, makes all messages associated with the subject or project unrecoverable. For example, in the context of litigation, a server recovery key may be established in association with a discovery request. At the end of the litigation, or when the discovery request has otherwise been satisfied, the server recovery key is deleted. This makes unrecoverable all messages associated with the server recovery key.

VII. Other Components

Policy email architecture 100 may include other components. According to one embodiment of the invention, policy email architecture 100 includes a software development kit, a universal viewer service, a policy design tool, a message recovery tool, a monitoring tool and an attachment reader. Each of these components is described hereinafter.

A. Universal Viewer Service

The Universal Viewer Service Universal Viewer Service allows all users (internal and external, with and without Policy Client) to view Policy Mail messages and is responsible for:

authenticating users that don't have the Policy Client displaying Policy Mail messages inline in viewing environments that support image elements and ilayer HTML elements by:

receiving XML fragments in img requests and ilayer requests.

reconstructing the XML from the fragments decrypting the XML and verifying its signature by contacting the Key Service on the user's behalf sending the message cleartext and policy information in response to the ilayer request.

displaying Policy Mail messages inline in viewing environments that support image elements but do not support or ilayer HTML elements by:

receiving all XML fragments in img requests reconstructing the XML from the fragments decrypting the XML and verifying its signature by contacting the Key Service on the user's behalf rendering the message cleartext and policy information into an image.

sending the image in response to one of the img requests.

displaying Policy Mail messages in a separate window in viewing environments that only support viewing HTML attachments by:

receiving all XML fragments as hidden form fields in a form POSTed by the browser.

reconstructing the XML from the fragments decrypting the XML and verifying its signature by contacting the Key Service on the user's behalf sending the cleartext, policy information, and message headers, in response to the form POST.

protecting the Policy Mail by sending the cleartext over an HTTPS connection.

discouraging copy and print (when specified in the policy) by overlaying the cleartext with an animated GIF that consists of a white frame followed by a transparent frame.

B. Policy Design Tool

The Policy Design Tool Policy Design Tool allows policies to be implemented for specific groups of users and is responsible for:

providing a user interface within Microsoft Management Console that allows an administrator to easily:

create policies that specify message confidentiality, retention, cache lifetime, treatment of attachments, and whether copy/print is blocked associate multiple policies with groups of users storing policies such that changes are available to users on a timely basis keeping an audit history of policy changes C. Message Recovery Tools The Message Recovery Tools provides for locating not-yet-deleted messages that are relevant to a discovery request and convert them to cleartext. Message recovery tools are responsible for:

providing a user interface within Microsoft Management Console for IT to stop and resume automatic expiration of server recovery keys and to create and delete "discovery" keys.

providing a user interface for IT to extract copies of Policy Mails from an Exchange server that might be relevant to a discovery request based on sender/recipient (or mailbox/folder), dates, and subject line.

re-encrypting the message keys of the extracted messages with a discovery key.

providing a user interface within Outlook for legal to convert messages which are actually relevant to cleartext for delivery to opposing counsel.

D. Monitoring Tools

The Monitoring Tools allow tracking of service performance and policy compliance. The monitoring tools are responsible for:

alerting IT (by email or a Windows event) when the Key Service or Universal Viewing Service is unavailable providing a user interface with Microsoft Management Console for IT to determine the current status of and load on the Key Service and Universal Viewing Service generating a "certificate of destruction" when a server recovery key is scrubbed.

generating a report indicating the percentage of messages that each user sends as Policy Mail.

E. Attachment Reader

The Attachment Reader allows Windows users to read protected Policy Mail attachments and is responsible for:

decrypting a Policy Mail Attachment (if necessary, prompting the user for authentication information)

launching the program associated with the decrypted attachment.

scrubbing the attachment from the disk once it is no longer being used by the program VIII. Implementation Mechanisms The approach described herein for managing access to messages provides for the enforcement of a message authorization and retention policy, such as a corporate email policy. Message keys are encrypted by policy clients using server recovery keys provided by a policy server. The message signature included in each policy email is tested by the policy server to prove authenticity and integrity of policy associated with the corresponding server recovery key. The approach also proves the authenticity of the sender by deriving the message signature using a user key that is unique to the sender and periodically rotated and encrypting message keys with a user key that is unique to the user.

The approach also provides increased immunity to tampering by unauthorized third parties and limits the number of vulnerable messages if keys are compromised. Specifically, the approach prevents tampering by third parties by including a digest (aka hash) of the message cleartext in the metadata, which is signed using the sender's user key, and by ensuring the user key is only known to the sender and the policy server. Also, the lifetime of user keys is limited to prevent terminated employees from continuing to sign messages. The approach ensures that expired keys cannot be recovered by periodically deleting and scrubbing server recovery keys, deriving user recovery keys from server recovery keys and encrypting message keys with keys derived from user recovery keys.

The approach is also highly scalable since no user-specific or message-specific data is retained on policy server 106.

The approach described herein for managing access to messages may be implemented in a variety of contexts using a variety of mechanisms and the invention is not limited to any particular context or mechanism. The approach is applicable to distributed applications where sender 102, recipient 104 and policy server 106 are implemented on separate nodes. Alternatively, any of these elements may be implemented together on a single node. The various components described herein, such as policy clients 118, 122 and policy server 106 may be implemented in computer hardware, computer software, or any combination of computer hardware and software.

Figure 5:
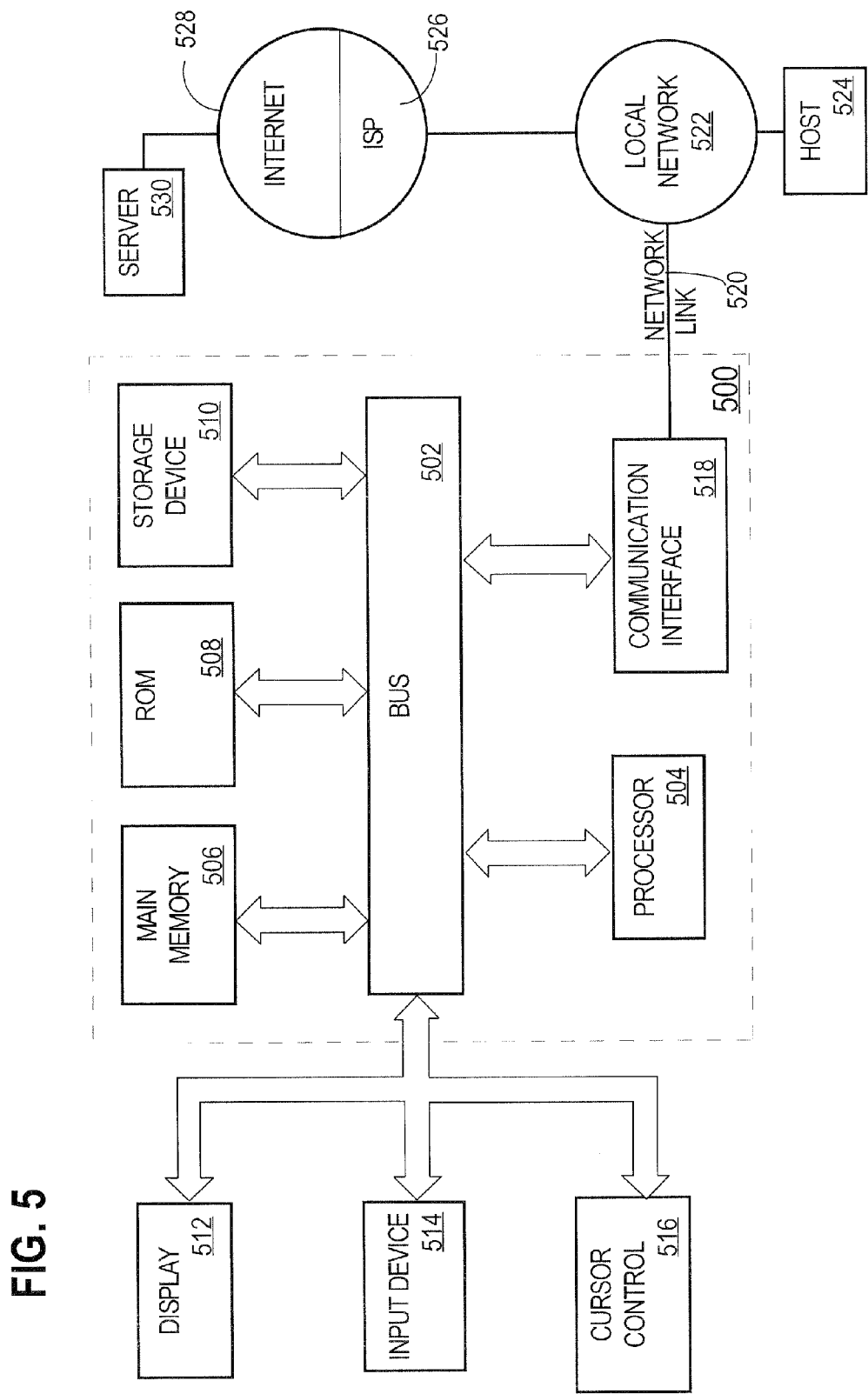
FIG. 5 is a block diagram of a computer system on which embodiments may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for managing access to messages using encryption key management policies. According to one embodiment of the invention, the managing access to messages using encryption key management policies is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for approach for managing access to messages using encryption key management policies as described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for sending a message from a sending client to a recipient client, the computer-implemented method comprising:
   receiving, at the sending client from a policy server, a user key that is generated based upon a user key descriptor that includes user identification data that uniquely identifies a user associated with the sending client,
   receiving, at the sending client, a user recovery key that is generated based upon both a server recovery key and the user identification data, wherein the policy server generates the server recovery key and manages the server recovery key in accordance with an encryption key management policy;
   generating, at the sending client, an encrypted message by encrypting the message with a message key;
   generating, at the sending client, an encrypted message key by encrypting the message key with at least the user key and the user recovery key;
   generating, at the sending client, metadata that defines one or more attributes of the message;
   generating, at the sending client, signature data and encrypting the metadata with the user key; and
   sending, from the sending client to the recipient client, the encrypted message, the encrypted message key, the metadata and the signature data.

2. The computer-implemented method as recited in claim 1, further comprising sending, from the sending client to the recipient client, a server recovery key ID that identifies the server recovery key used to generate the user recovery key.

3. The computer-implemented method as recited in claim 1, wherein:
   encrypting the metadata with the user key includes generating encrypted metadata by encrypting the metadata with the user key; and
   sending, from the sending client to the recipient client, the metadata includes sending the encrypted metadata from the sending client to the recipient client.

4. The computer-implemented method as recited in claim 1, wherein the encrypted message and the encrypted message key are sent to the recipient in an HTML message.

5. The computer-implemented method as recited in claim 1, wherein the policy server deletes the server recovery key in accordance with the encryption key management policy.

6. The computer-implemented method as recited in claim 1, further comprising deleting, at the sending client, the message key.

7. A volatile or non-volatile computer-readable storage medium for sending a message from a sending client to a recipient client, the computer-readable medium storing instructions which, when processed by one or more processors, cause:
   the sending client receiving, from a policy server, a user key that is generated based upon a user key descriptor that includes user identification data that uniquely identifies a user associated with the sending client,
   the sending client receiving a user recovery key that is generated based upon both a server recovery key and the user identification data, wherein the policy server generates the server recovery key and manages the server recovery key in accordance with an encryption key management policy;
   the sending client generating an encrypted message by encrypting the message with a message key;
   the sending client generating an encrypted message key by encrypting the message key with at least the user key and the user recovery key;
   the sending client generating metadata that defines one or more attributes of the message;
   the sending client generating signature data and encrypting the metadata with the user key; and
   the sending client sending the encrypted message, the encrypted message key, the metadata and the signature data to the recipient client.

8. The volatile or non-volatile computer-readable storage medium as recited in claim 7, further storing one or more additional instructions which, when processed by the one or more processors, cause the sending client to send to the recipient client a server recovery key ID that identifies the server recovery key used to generate the user recovery key.

9. The volatile or non-volatile computer-readable storage medium as recited in claim 7, wherein:
   the sending client encrypting the metadata with the user key includes generating encrypted metadata by encrypting the metadata with the user key; and
   the sending client sending the metadata to the recipient client includes the sending client sending the encrypted metadata to the recipient client.

10. The volatile or non-volatile computer-readable storage medium as recited in claim 7, wherein the encrypted message and the encrypted message key are sent to the recipient in an HTML message.

11. The volatile or non-volatile computer-readable storage medium as recited in claim 7, wherein the policy server deletes the server recovery key in accordance with the encryption key management policy.

12. The volatile or non-volatile computer-readable storage medium as recited in claim 7, further storing one or more additional instructions which, when processed by the one or more processors, cause the sending client to delete the message key.

13. An apparatus for sending a message from a sending client to a recipient client, the apparatus comprising a memory storing instructions which, when processed by one or more processors, cause:
   the sending client receiving, from a policy server, a user key that is generated based upon a user key descriptor that includes user identification data that uniquely identifies a user associated with the sending client,
   the sending client receiving a user recovery key that is generated based upon both a server recovery key and the user identification data, wherein the policy server generates the server recovery key and manages the server recovery key in accordance with an encryption key management policy;
   the sending client generating an encrypted message by encrypting the message with a message key;
   the sending client generating an encrypted message key by encrypting the message key with at least the user key and the user recovery key;

the sending client generating metadata that defines one or more attributes of the message;

the sending client generating signature data and encrypting the metadata with the user key; and the sending client sending the encrypted message, the encrypted message key, the metadata and the signature data to the recipient client.

14. The apparatus as recited in claim 13, wherein the memory further stores one or more additional instructions which, when processed by the one or more processors, cause the sending client to send to the recipient client a server recovery key ID that identifies the server recovery key used to generate the user recovery key.

15. The apparatus as recited in claim 13, wherein:

the sending client encrypting the metadata with the user key includes generating encrypted metadata by encrypting the metadata with the user key; and the sending client sending the metadata to the recipient client includes the sending client sending the encrypted metadata to the recipient client.

16. The apparatus as recited in claim 13, wherein the encrypted message and the encrypted message key are sent to the recipient in an HTML message.

17. The apparatus as recited in claim 13, wherein the policy server deletes the server recovery key in accordance with the encryption key management policy.

18. The apparatus as recited in claim 13, wherein the memory further stores one or more additional instructions which, when processed by the one or more processors, cause the sending client to delete the message key.

* * * * *